(12) United States Patent
Grunlan et al.

(10) Patent No.: US 10,016,952 B2
(45) Date of Patent: Jul. 10, 2018

(54) SPRAY FORMATION OF AN IMPERMEABLE BARRIER LAYER ON A TIRE

(71) Applicants: Compagnie Generale Des Etablissements Michelin, Clermont-Ferrand (FR); The Texas A&M University System, College Station, TX (US)

(72) Inventors: Jaime C. Grunlan, College Station, TX (US); Paul Winston, Greenville, SC (US); John J. McHugh, Greenville, SC (US); Charlie Wen, Greenville, SC (US)

(73) Assignees: Compagnie Generale des Etablissements Michelin (FR); The Texas A&M University System, College Station, TX (US)

( * ) Notice: Subject to any disclaimer, the term of this patent is extended or adjusted under 35 U.S.C. 154(b) by 0 days.

(21) Appl. No.: 15/532,048

(22) PCT Filed: Nov. 23, 2015

(86) PCT No.: PCT/US2015/062224
§ 371 (c)(1),
(2) Date: May 31, 2017

(87) PCT Pub. No.: WO2016/099818
PCT Pub. Date: Jun. 23, 2016

(65) Prior Publication Data
US 2017/0313005 A1    Nov. 2, 2017

Related U.S. Application Data

(60) Provisional application No. 62/094,714, filed on Dec. 19, 2014.

(51) Int. Cl.
*B29D 30/00* (2006.01)
*B29D 30/06* (2006.01)
(Continued)

(52) U.S. Cl.
CPC ...... *B29D 30/0061* (2013.01); *B05B 13/0645* (2013.01); *B05D 1/002* (2013.01);
(Continued)

(58) Field of Classification Search
CPC ............ B05B 13/0645; B29D 30/0685; B29D 30/0662; B29D 2030/0663; B60C 1/008;
(Continued)

(56) References Cited

U.S. PATENT DOCUMENTS 3,825,965 A * 7/1974 Root ................... B29D 30/0633
                                                          118/318
3,987,833 A * 10/1976 Powell ............... B29D 30/0633
                                                          152/154.1
(Continued)

OTHER PUBLICATIONS

International Preliminary Report on Patentability for Application No. PCT/US2015/062224 dated Jun. 29, 2017.
(Continued)

*Primary Examiner* — William P Fletcher, III
(74) *Attorney, Agent, or Firm* — Tumey L.L.P.

(57) ABSTRACT

A method is provided for forming an impermeable barrier layer on an inner tire surface of a tire. An assembly is also provided along with a kit for forming an impermeable barrier layer on an inner tire surface of a tire accordingly.

20 Claims, 4 Drawing Sheets

(51) Int. Cl.
*B05D 7/24* (2006.01)
*B05D 7/22* (2006.01)
*B05D 7/02* (2006.01)
*B05D 5/00* (2006.01)
*B05D 1/02* (2006.01)
*B05B 13/06* (2006.01)
*B05D 1/00* (2006.01)

(52) U.S. Cl.
CPC ............... *B05D 1/02* (2013.01); *B05D 5/00* (2013.01); *B05D 7/02* (2013.01); *B05D 7/22* (2013.01); *B05D 7/24* (2013.01); *B29D 30/0662* (2013.01); *B29D 30/0685* (2013.01); *B29D 2030/0663* (2013.01)

(58) Field of Classification Search
CPC . B05D 1/002; B05D 1/02; B05D 5/00; B05D 7/02; B05D 7/22; B05D 7/24; B05D 7/52; B05D 2259/00
USPC .......................................... 427/233; 118/318
See application file for complete search history.

(56) References Cited

U.S. PATENT DOCUMENTS

| | | | | |
|---|---|---|---|---|
| 4,115,172 A | * | 9/1978 | Baboff | ............... B29C 73/166 |
| | | | | 118/202 |
| 4,206,008 A | * | 6/1980 | Tacke | ................. B05L 37/32 |
| | | | | 118/318 |
| 5,036,113 A | * | 7/1991 | Boon | ................... B32B 25/00 |
| | | | | 522/174 |
| 7,122,220 B1 | | 10/2006 | Hawkins et al. | |
| 2012/0210933 A1 | * | 8/2012 | Naito | ................... B29C 73/18 |
| | | | | 118/641 |

OTHER PUBLICATIONS

International Search Report and Written Opinion for Application No. PCT/US15/62224 dated Feb. 2, 2016.

* cited by examiner

SPRAY FORMATION OF AN IMPERMEABLE BARRIER LAYER ON A TIRE

CROSS REFERENCE TO RELATED APPLICATIONS

The present application is a non-provisional of U.S. provisional patent application Ser. No. 62/094,714, filed on Dec. 19, 2014, titled "Spray Formation of an Impermeable Barrier Layer on a Tire," the disclosure of which is incorporated herein by reference in its entirety.

BACKGROUND

The present disclosure is generally directed to manufacture of a tire. More particularly, the present disclosure is directed to employment of spray technology to effect layer-by-layer (LbL) assembly during tire manufacture.

During layer-by-layer (LbL) assembly (also known as "layer-by-layer process" or "process," and "layer-by-layer technique" or "technique"), deposition of alternating layers of oppositely charged materials is typically performed with intervening wash steps. Application of each layer with precision as to volume and sequence, combined with adequate rinsing after application of each solution, enables the fabrication of a robust LbL assembly. Such technique may permit the integration of easy and inexpensive processes for multilayer formation and allows a variety of materials to be incorporated within film structures.

LbL assembly may be optionally combined with one or more other fabrication techniques to enable preparation of LbL films composed of various materials. The resulting structures can be used for the fabrication of multilayer thin films with controlled architecture and composition. Among the physical applications that are amenable to LbL assembly are highly impermeable air barriers employed in the manufacture of tires (for example, as a replacement for thick butyl inner liners for pneumatic tires). While conventional LbL assembly can be readily effected upon essentially flat substrates, reliable and cost-effective LbL techniques are demanded that permit the application of LbL assemblies to surfaces having complex curvature, such as the curvature exhibited by tires.

SUMMARY

Embodiments include one or more methods for forming an impermeable barrier layer on an inner tire surface of a tire. In an embodiment, at least one spray post is provided that includes at least one of: at least one rotation platform for rotating one or more tires; at least one reservoir station with one or more reservoirs; and at least one rinse delivery system for delivering one or more rinses to the tire inner surface. Each reservoir may house one ingredient of a recipe for a layer-by-layer (LbL) assembly selected for application to the inner tire surface. The ingredients include one or more solutions. After building the tire exclusive of the barrier layer, a solution layer is sprayed onto the inner tire surface, after which a rinse is applied prior to spraying another solution layer thereupon. The tire is rotated around a tire axis during spraying of each solution layer and each rinse. The LbL assembly is formed upon spraying a final layer of the recipe.

In some embodiments, one or more presently disclosed methods may also include drying at least a portion of the inner tire surface after spraying the rinse and prior to spraying a subsequent solution layer. Drying may include applying suction to at least a portion of the inner tire surface.

In some embodiments, the one or more solutions are selected from at least one of a plurality of cationic solutions and a plurality of anionic solutions. In some embodiments, each rotation platform may include at least one spray delivery system for delivery of at least one solution layer and at least one rinse to the inner tire surface. One or more of the solution layers and the rinses may be sprayed sequentially.

Each spray delivery system may include one or more spray heads with each spray head in fluid communication with at least one reservoir, and each spray head has one or more nozzles optionally arranged in a substantially linear relationship along a common axis. A selected solution may be optionally delivered to at least one corresponding selected nozzle.

An assembly is also provided that includes a tire having an inner tire surface and an impermeable barrier layer formed therealong according to the presently disclosed methods.

Additionally, a kit is provided for forming an impermeable barrier layer on an inner tire surface of a tire according to the presently disclosed methods. In some embodiments, the kit may include at least one selected rotation platform that is interchangeable with at least one other non-selected rotation platform. The kit also includes at least one selected reservoir station that is interchangeable with at least one other non-selected reservoir station. The tire may be positionable relative to at least one spray delivery system provided at each rotation platform for delivery of at least one solution layer to the inner tire surface. Each spray delivery system may include one or more spray heads with each spray head in fluid communication with at least one reservoir. Each spray head may include one or more nozzles optionally arranged in a substantially linear relationship along a common axis.

Other aspects of the presently disclosure will become readily apparent from the following detailed description.

BRIEF DESCRIPTION OF THE DRAWINGS

The nature and various advantages of the presently disclosed invention will become more apparent upon consideration of the following detailed description, taken in conjunction with the accompanying drawings, in which like reference characters refer to like parts throughout, and in which.

DETAILED DESCRIPTION

Reference now will be made in detail to embodiments of the invention, one or more examples of which are illustrated in the drawings. Each example is provided by way of explanation and not by limitation of the presently disclosed invention. It will be apparent to those skilled in the art that various modifications and variations can be made in the present invention without departing from the scope or spirit of the invention. For instance, features illustrated or described as part of one embodiment can be used with one or more other embodiments to yield at least one further embodiment. Thus, it is intended that the present invention covers such modifications and variations as come within the scope of the appended claims and their equivalents.

Figure 1:
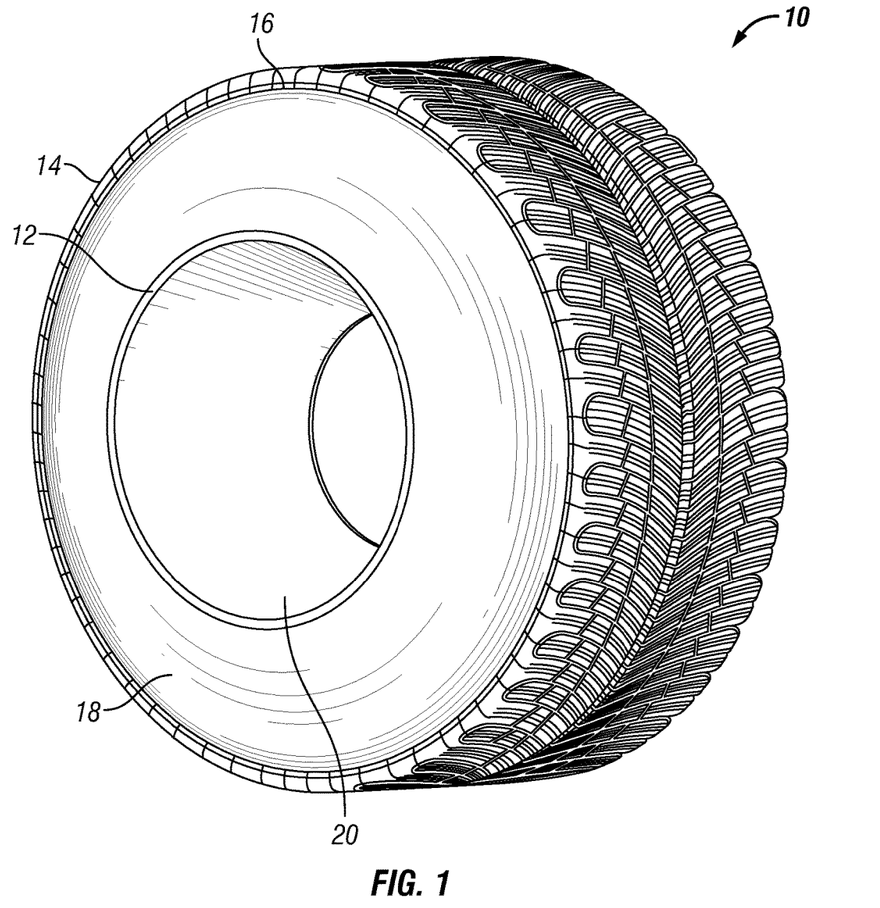
FIG. 1 shows an embodiment of a tire having an impermeable inner barrier amenable to fabrication in accordance with the present disclosure.

Referring to the figures, wherein like numbers represent like elements, FIG. 1 shows an embodiment of tire 10 that may be manufactured with a substantially impermeable air barrier that is amenable to fabrication by the present disclosure. Tire 10 may include a tire casing 12 with a laterally extending tread 14, shoulders 16, and sidewall 18. An inner layer 20 is provided on an inner tire surface (not shown), which inner layer 20 is an air-impermeable layer composed of a rubber such as butyl rubber. Laterally extending tread 14 may be original to a newly fabricated tire or may be applied to tire casing 12 (e.g., via one or more bonding layers) during a retread process. One or more tread elements may be integral with laterally extending tread 14 in any suitable configurations. It is to be understood that the configuration of laterally extending tread 14 is not limited to that shown herein and that a variety of tread configurations are amenable for use with a selected carcass.

Figure 2:
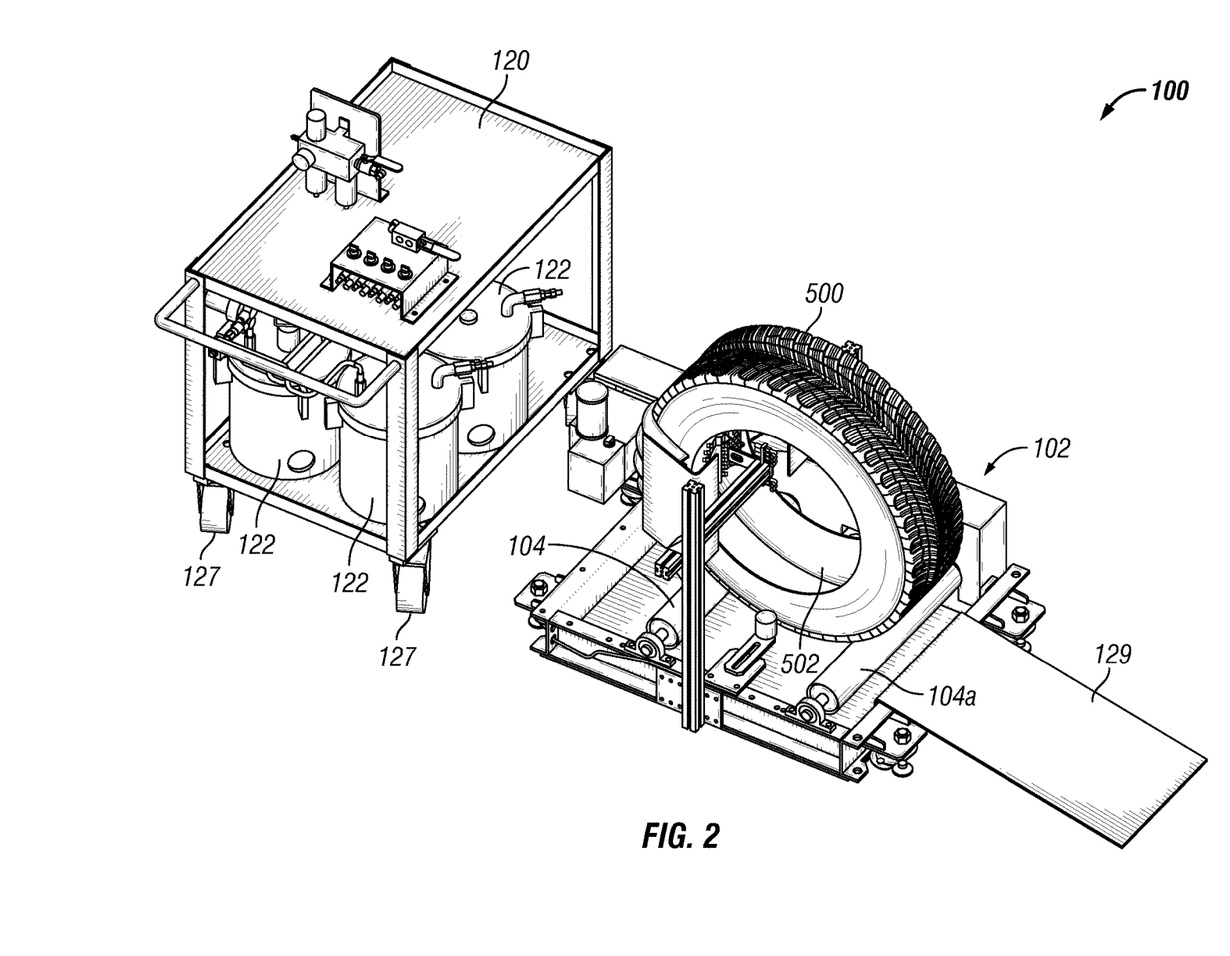
FIG. 2 shows a top perspective view of an embodiment of a spray post for application of an impermeable barrier assembly in accordance with the present disclosure.

Now referring to FIG. 2, an embodiment spray post 100 is shown that can apply a variety of different solutions sequentially according to selected LbL recipes. Spray post 100 is amenable to creation of an impermeable barrier layer to an inner tire surface via an LbL process that may involve the sequential deposition of one or more species, including but not limited to polymers, nanoparticles, lipids, proteins and dye molecules. Control of material properties (e.g., size, composition, thickness, permeability, function) is effected not only by the type of species selected for an LbL assembly but also by the order of deposition. It is therefore to be understood that there is no limit to the LbL recipes that may be applied by spray post 100 and that any selected recipe for fabrication of an impermeable barrier layer is contemplated for application thereby.

Spray post 100 includes at least one rotation platform 102 that may incorporate one or more drive rollers 104. At least one drive roller 104 is motor-driven to effect predictable and controllable rotation of a tire 500 thereby while another drive roller 104a may act as an idler. Tire 500 has a general construction similar to that of tire 10 shown in FIG. 1 with the tire 500 being at least partially vulcanized and having an inner tire surface 502 for delivery of an impermeable barrier layer thereto. It is to be understood that tire 500 may be selected from any pneumatic tire configuration requiring an impermeable barrier liner and is not limited to any particular tire configuration.

Figure 3:
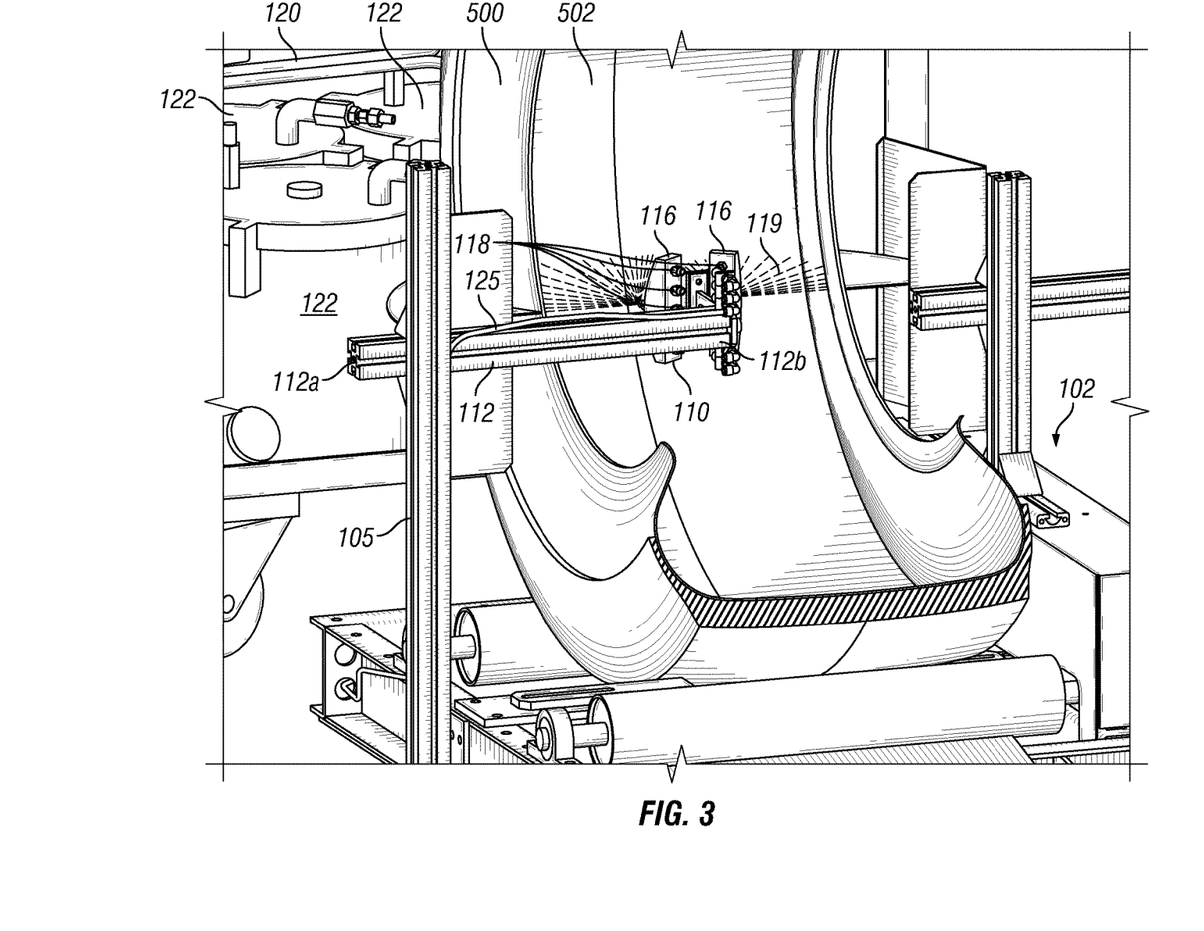
FIG. 3 shows a partial perspective view of an embodiment of a spray nozzle system employed by the spray post of FIG. 2.

Referring further to FIG. 2 and additionally to FIG. 3, at least one support member 105 is provided at rotation platform 102 with each support member 105 supporting a spray delivery system 110 thereby. Each spray post 100 includes an adjustable arm 112 having a predetermined length delineated by opposed extents 112a, 112b. Spray delivery system 110 is operatively disposed intermediate extent 112a secured to support member 105 and opposed extent 112b being a free extent. Adjustable arm 112 may be reciprocatable relative to support member 105 along at least a portion of its length. Spray delivery system 110 may be reciprocatable along at least a portion of the length of adjustable arm 112 intermediate support member 105 and free extent 112b to ensure proper placement of the spray delivery system relative to inner tire surface 502.

In an embodiment, spray delivery system 110 includes one or more spray heads 116 having a plurality of spray nozzles 118 generally distributed in an array therealong. Although two spray heads 116 are shown in the accompanying figures, it is to be understood that the present disclosure contemplates the use of more or fewer spray heads 116 without deviating from the scope of the present disclosure. For example, each spray head 116 may incorporate one or more spray nozzles 118 (or one or more types of spray nozzles 118) to accommodate a plurality of tire 500 types having plural performance characteristics yet all sharing the common characteristic of an impermeable air barrier. In exemplary embodiments that employ two or more spray nozzles 118, one or more of such spray nozzles 118 may be actuated simultaneously and/or in sequence to effect a selected LbL assembly depending upon the assembly recipe.

In embodiments, spray heads 116 and spray nozzles 118 are arranged to ensure complete bead-to-bead spraying coverage along inner tire surface 502. As shown in FIGS. 2 and 3, multiple spray nozzles 118 can be arranged in a substantially linear relationship along a common axis, although it is to be understood that there may be a variation in alignment from a perfect linear relationship. In embodiments, the customizable nozzle arrays that are selectively actuated according to a selected LbL assembly recipe (e.g., by one or more controllers) may be used. Such exemplary arrays may adhere to a programmed spray path 119 along inner tire surface 502 and consequently follow the complex curvature thereof. It is contemplated that one or more sensors and sensor types (not shown) may be optionally employed simultaneously, including but not limited to environmental sensors (e.g., to sense atmospheric conditions such as temperature, pressure and/or humidity prior to initiation of a programmed spray path 119) and distance sensors (e.g., to sense deviation from a programmed spray path 119). In this manner, an increased number and variety of LbL assembly recipes may be applied in view of the selected tire manufacture while ensuring the integrity of the spray paths.

According to some embodiments, an LbL assembly may be applied to an inner tire surface 502 (e.g., a pneumatic tire such as tire 500) to produce an impermeable diffusion barrier therefor (as used herein, "diffusion barrier," "barrier," "barrier layer," and "inner liner" are used interchangeably to refer to an air impermeable layer of a pneumatic tire typically integrated with an inner surface thereof). The LbL assembly may be fabricated from a predetermined recipe selected from a plurality of LbL assembly recipes amenable to production as an impermeable diffusion barrier for a pneumatic tire. Exemplary embodiments of such diffusion barriers, and particularly thin film barriers of materials employed as gas barriers for tires, are disclosed by co-owned and co-pending PCT Publication No. WO2014/106214 for a THIN-FILM DIFFUSION BARRIER, filed 30 Dec. 2013, the entire disclosure of which is incorporated by reference herein. It is understood that the LBL assembly is not limited to use with any specific diffusion barrier (or any commensurate recipe therefor) and is therefore amenable to LbL assembly regardless of the elected composition.

With continued reference to FIGS. 2 and 3, in combination with rotation platform 102, spray post 100 includes a reservoir station 120 with one or more reservoirs 122 provided thereat. Each reservoir 122 houses one ingredient of an LbL assembly recipe selected for application to inner tire surface 502. An ingredient may be an anionic solution or a cationic solution prepared for spray application to inner tire surface 502 according to the selected LbL assembly recipe. At least one reservoir 122 may be in fluid communication with a rinse delivery system (not shown) provided at, adjacent to or in communication with reservoir station 120. Each such rinse delivery system may enable uninterrupted and predictable access to large volumes of rinse water or other rinsing solution (collectively, "rinse") that is employed during recipe creation as further described herein. In alternative embodiments, the rinse delivery system may be provided apart from the reservoir station (e.g., as a fixed fluid conduit or fixed rinse reservoir made available to multiple rotation platforms and/or other production functions).

Figure 4:
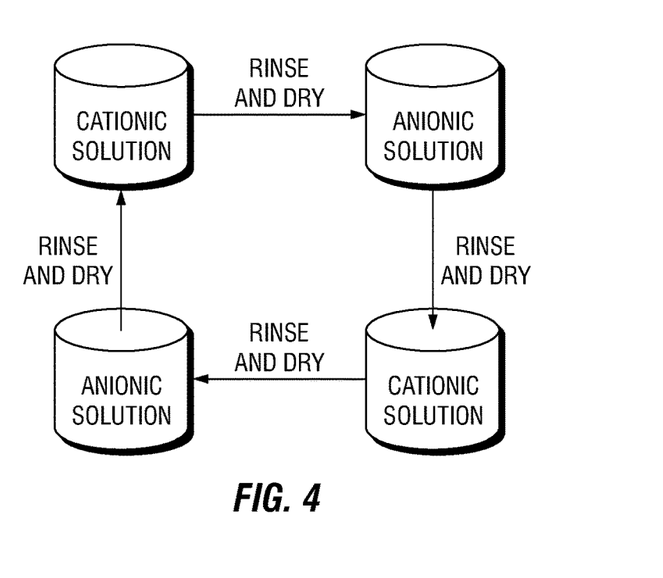
FIG. 4 shows a schematic view of an embodiment of an LbL assembly process.

The recipe is selected to effect accurate performance of an LbL assembly process, an example of which is shown in FIG. 4. As depicted, during such a process, alternating layers of cationic and anionic solutions are applied with a rinse applied between applications of each solution. Each of a selected cationic solution and an anionic solution may be selected materials including but not limited to polymers, colloidal particles, nanoparticles, salts and any combination and equivalent thereof. Each such solution may be an aqueous solution. It is to be understood that an LbL assembly process as presently disclosed herein may be acquired iteratively as proscribed by a selected LbL recipe. It is to be further understood that one or more steps in a selected LbL assembly process may be executed at a determined time and for a determined duration, which steps may be executed sequentially or non-sequentially. The process is not limited to the specific anionic and cationic layers as depicted and may include more or fewer layers of each solution or of any other amenable solution as dictated by the selected LbL assembly recipe.

The cationic solution comprises cationic materials. In some embodiments, one or more cationic layers may be neutral. Without limitation, the cationic materials may comprise polymers, colloidal particles, nanoparticles, or any combinations thereof. The polymers may include cationic polymers, polymers with hydrogen bonding, or combinations thereof. Without limitation, examples of suitable cationic polymers include branched polyethylenimine, linear polyethylenimine, cationic polyacrylamide, cationic poly diallyldimethylammonium chloride, poly(allyl amine), poly (allyl amine) hydrochloride, poly(vinyl amine), poly(acrylamide-co-diallyldimethylammonium chloride), or combinations thereof. Without limitation, examples of suitable polymers with hydrogen bonding include polyethylene oxide, polyglycidol, polypropylene oxide, poly(vinyl methyl ether), polyvinyl alcohol, polyvinylpyrrolidone, polyallylamine, branched polyethylenimine, linear polyethylenimine, poly(acrylic acid), poly(methacrylic acid), tannic acid, copolymers thereof, or any combinations thereof. Without limitation, colloidal particles include organic and/or inorganic materials, specific examples of colloidal particles include clays, layered double hydroxides, inorganic hydroxides, silicon based polymers, polyoligomeric silsesquioxane, carbon nanotubes, graphene, or combinations thereof. Without limitation, examples of suitable layered double hydroxides include hydrotalcite, magnesium LDH, aluminum LDH, or combinations thereof.

The anionic solution comprises anionic materials. In some embodiments, one or more anionic layers may be neutral. The anionic materials may comprise anionic polymers, colloidal particles, or any combinations thereof. Without limitation, examples of suitable anionic polymers include polystyrene sulfonate, polymethacrylic acid, polyacrylic acid, poly(acrylic acid, sodium salt), polyanetholesulfonic acid sodium salt, poly(vinylsulfonic acid, sodium salt), or any combinations thereof. Colloidal particles may include organic and/or inorganic materials, specific examples of colloidal particles may include clays, colloidal silica, inorganic hydroxides, silicon based polymers, polyoligomeric silsesquioxane, carbon nanotubes, graphene, or any combinations thereof. Any type of clay suitable for use in an anionic solution may be used. Without limitation, examples of suitable clays include sodium montmorillonite, hectorite, saponite, Wyoming bentonite, vermiculite, halloysite, or any combinations thereof. In an embodiment, the clay is sodium montmorillonite. Any inorganic hydroxide that may provide retardancy to gas or vapor transmission may be used. In an embodiment, the inorganic hydroxide includes aluminum hydroxide, magnesium hydroxide, or any combinations thereof.

In some embodiments of FIG. 3, each reservoir 122 is in fluid communication with at least one spray head 116 for delivery of a specified solution or rinse to inner tire surface 502 according to the specified process. Fluid communication may be effected by one or more conduits 125 (as shown on FIG. 3) as known in the art (e.g., one conduit may be correspondingly dedicated for transfer of a specific solution or rinse to one or more specified spray heads 116 and even one or more specified spray nozzles 118). One or more spray nozzles 118 may be dedicated to application of a selected solution. For example, one spray nozzle 118 may be employed solely for the application of an anionic solution while another spray nozzle 118 may be employed solely for the application of a cationic solution. Likewise, one or more spray nozzles 118 may be dedicated to the application of rinse which rinse may be directed sequentially or simultaneously through such spray nozzles 118. The delivery of specific solutions by dedicated spray nozzles 118 ensures desirable electrostatic interaction between layers while obviating agglomeration and contamination of solutions and rinses.

As shown in FIGS. 2 and 3, reservoir station 120 may be a portable station, for instance having wheels 127 that enable the reservoir station 120 to be interchangeable with one or more other like reservoir stations 120. Such other reservoir stations 120 may have like reservoirs 122 having different solutions therein for ready application of a designated LbL assembly recipe. In this manner, spray post 100 incorporates modularity of the LbL assembly in concert with the variety of tires (e.g., tire 500) to be manufactured. It is to be understood that portability is not limited to wheeled structures and may be effected by equivalent means as known by one of ordinary skill in the art (e.g., conveyors, rails, pulleys, chains, etc.).

In one or more embodiments of methods of fabricating a diffusion barrier using spray post 100 as shown in FIGS. 2 and 3, spray post 100 enables the sequential application of rinse water after application of each solution. Referring to FIGS. 2 and 3 and also to FIG. 5, tire 500 is positioned at rotation platform 102. A ramp 129 may be optionally employed for ease of positioning tire 500 on the rotation platform 102 (although it is to be understood that tire 500 may be positioned at rotation platform 102 by any suitable means). Drive roller 104 is actuated to impart corresponding rotation to tire 500 in the direction of arrow A (see FIG. 5). When applying each solution layer and each rinse to inner tire surface 502, a rotational speed applied to tire 500 may not be restricted so long as the spray nozzle 118 opening shape and spraying pressure are sufficient to diffuse and spread each layer uniformly to cover a bead-to-bead distance of inner tire surface 502. Depending upon the selected LbL assembly recipe, a rotational speed of tire 500 can be adjusted to ensure formation of a uniform barrier layer. The solutions are selected such that a stable interface between applied solutions is attained. A thickness of the barrier layer may also be adjusted thereby to attain any commercially acceptable thickness in a predictable and repeatable manner.

The cationic and anionic solution layers may have any desired thickness. In embodiments, each layer is between about 0.5 nanometers and about 100 nanometers thick, alternatively between about 1 nanometer and about 100 nanometers thick, and alternatively between about 0.5 nanometers and about 10 nanometers thick.

Figure 5:
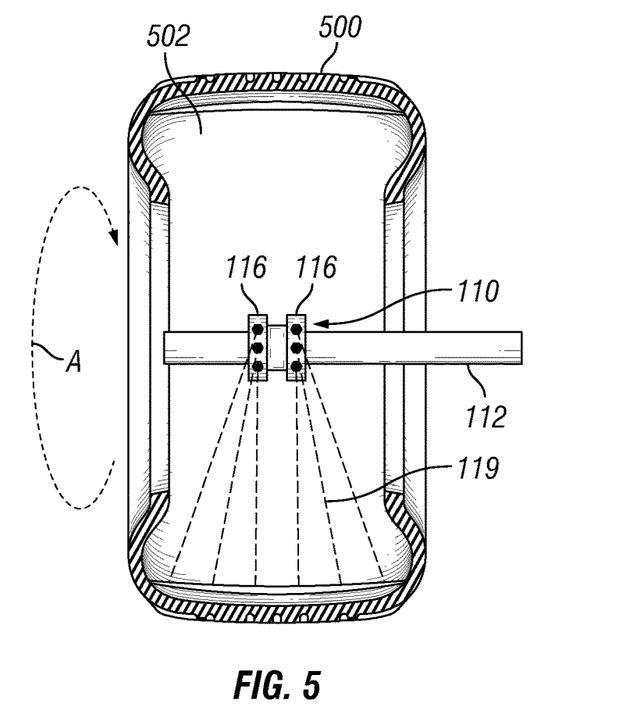
FIG. 5 shows a schematic view of an embodiment of the spray nozzle system of FIG. 3 during spray application of an LbL assembly to an inner tire surface.

As rotation of tire 500 is effected on rotation platform 102, spray heads 116 are positioned relative to inner tire surface 502 so as to apply a sprayed layer thereon. Spray heads 116 may be pre-positioned relative to rotation platform 102 prior to introduction of tire 500 thereon. Alternatively, tire 500 may be positioned on rotation platform 102 and spray heads 116 may be subsequently adjusted so as to be positioned for uniform spray application. A programmed spray path 119, examples of which are shown in FIGS. 3 and 5, can be executed upon initiation of fluid delivery from spray nozzles 118. One or more spray guards (not shown) may be incorporated at rotation platform 102 to protect the surrounding environment from unintentional spatter.

As shown in FIG. 4, one or more embodiments of an LbL assembly process may include drying at least a portion of the inner tire surface after spraying the rinse layer and prior to spraying a subsequent solution layer. Drying may include applying suction to at least a portion of inner tire surface 502 after each application of solution and rinse to construct an inner barrier layer that is uniform and generally free from defects. Suction may be applied through one or more dedicated spray nozzles 118, for example, after each application of rinse and prior to each subsequent solution application (it is to be understood that a common spray nozzle 118 may not deliver both the suction and the spray). In alternative embodiments, one or more separate suction nozzles or like devices (not shown) may be dedicated for the application of suction so as to obviate fluid accumulation along any portion of inner tire surface 502.

It is to be understood that the LbL assembly is not limited to exposure of a tire 500 to a cationic solution followed by an anionic solution. The LbL assembly method includes exposure of a tire 500 to a cationic solution followed by an anionic solution, or alternatively, exposure of a tire 500 to an anionic solution followed by exposure to a cationic solution. Further, more than one cationic and/or anionic solution layer may be applied. For example, an LbL assembly method may include application of a plurality of cationic solution layers and a plurality of anionic solution layers. The plurality of cationic solution layers or anionic solution layers may comprise more than one type of cationic or anionic material respectively. Alternatively, the plurality of cationic solution layers or anionic solution layers may comprise the same type of cationic or anionic material respectively. For example, an LbL assembly method may comprise application of a first cationic solution layer comprising a first cationic material, application of a first anionic solution layer comprising a first anionic material, application of a second cationic solution layer comprising a second cationic material different from the first cationic material, application of a second anionic solution layer comprising the first anionic material, and so forth. Solution layers may continue to be added until the desired properties are obtained. Thus, it is to be understood that a barrier layer is not limited to one cationic and/or anionic solution layer as well as one cationic and/or anionic material.

At the time of positioning spray heads 116, fluid communication is established between spray nozzles 118 and one or more of reservoirs 122. A solution or rinse is delivered from the rinse delivery system to tire inner surface 502 along the programmed spray path 119. The programmed spray path 119 may be substantially identical for all solutions and rinses to ensure sufficient overlap, although it is contemplated that programmed spray paths 119 may be employed in consideration of the material properties of the solution or rinse to be sprayed. For example, for some recipes, spraying solution from one or more spray nozzles 118 may create an overlap that is obviated by one or more subsequent rinse applications. The viscosity of each solution and rinse may not be restricted so long as the resultant LbL assembly demonstrates the performance characteristics of a thin-film impermeable barrier layer suitable for the tire 500 with which it is integrated. While each solution layer may be subject to gravity flow upon ceasing tire 500 rotation, consistent solution spraying interspersed by rinse spraying (and application of suction between layer applications) ensures a uniform film thickness.

In embodiments, a barrier layer may be used to prevent migration of gases and fluids into the tire 500. Examples of gases which may be blocked from diffusing into the tire 500 include air, oxygen, ozone, water vapor, and the like. Examples of fluids that may be blocked from diffusing into the tire 500 include water and the like. Without limitation by theory, the barrier layer may form a barrier to gases and fluids such that most if not all gases or fluids are unable to diffuse into a tire 500 coated with one or more barrier layers. In some embodiments, a tire 500 with an applied barrier layer may have gas transmission rate between about 0.03 cc/(m2*day*atm) and about 100 cc/(m2*day*atm), alternatively between about 0.3 cc/(m2*day*atm) and about 100 cc/(m2*day*atm), and alternatively between about 3 cc/(m2*day*atm) and about 30 cc/(m2*day*atm).

In some embodiments, protective anti-degradants may be applied to tire 500. Anti-degradants such as various waxes or antioxidants such as N-(1,3-dimethylbutyl)-N'-phenyl-p-phenylenediamine ("6PPD"); 2,2,4-trimethyl-1,2-dihydroquinoline ("TMQ"); N-isopropyl-N'-phenyl-p-phenylenediamine ("IPPD"); or 6-ethoxy-2,2,4-trimethyl-1,2-dihydroquinoline ("ETMQ"); may be protected from consumption by oxidants, ozonants, and the like by the barrier layer. These anti-degradants may then themselves possess a longer shelf life when protected by a barrier layer. Once the tires have been sold, the barrier layer may be rubbed or washed with use over time, allowing the anti-degradants to migrate to the surface of the tire to initiate their normal functionality.

EXAMPLES

A post-vulcanization pneumatic tire 500 is positioned on rotating platform 102 so as to rotate about a tire axis. Spray heads 116 are positioned relative to inner tire surface 502 so as to effect a bead-to-bead spray application of a diffusion layer. According to the selected LbL assembly recipe, a solution layer is delivered from a reservoir 122 housing a cationic solution therein to one or more spray nozzles 118. The cationic solution is sprayed along inner tire surface 502 until bead-to-bead coverage is attained thereon. Such uniform application is effected after one tire rotation. After applying this solution layer, the rinse delivery system delivers a water rinse directly to inner tire surface 502 so as to effect bead-to-bead application thereof. The water rinse assumes a generally similar spray path as the spray path taken by the cationic solution. The rinse is applied after one tire rotation. Suction is applied thereafter until residual fluid is eliminated from the inner tire surface 502.

Another solution layer is subsequently delivered from a reservoir 122 housing an anionic solution to one or more spray nozzles 118. The anionic solution is sprayed along inner tire surface 502 until bead-to-bead coverage is attained thereon. Such uniform application is effected after one tire rotation. After applying this second solution layer, another water rinse is delivered directly to inner tire surface 502 so as to effect bead-to-bead application thereof. The water rinse assumes a generally similar spray path as the spray path taken by the anionic solution. The rinse is applied after one tire rotation. Suction is applied thereafter until residual fluid is eliminated from the inner tire surface 502.

Each of the cationic solution and the anionic solution is then sequentially applied in a commensurate manner to inner tire surface 502 with an intervening rinse application and suction application between solution layers. After the final rinse is applied and the residual fluid removed, the resulting uniform LbL assembly is attained.

Thus, a substantially impermeable barrier layer is applied having air retention characteristics commensurate with those of a conventional butyl inner liner. An LbL assembly as applied by spray post 100 obviates air permeability and thereby inhibits oxidation of the steel belts. Such characteristics are derived in concert with efficient air retention that attenuates loss of air pressure over time and thereby preserves a tire's beneficial rolling resistance. The gas permeability of the derived inner liner can be made very small compared to that of conventional butyl liners with the resulting inner liner having reduced weight. Spray post 100 ensures the consistent and predictable production of thin-film barriers exhibiting such characteristics while mitigating the temporal and fiscal costs inherent in butyl liner integration.

It is to be understood that the present disclosure contemplates one or more systems for manufacturing a plurality of tire barriers for a plurality of tires. Each such system may include a series of spray posts, one or more of which is selected from a plurality of spray posts as disclosed herein. Each such system may accommodate application of an impermeable barrier assembly according to an LbL assembly recipe selected from a plurality of LbL assembly recipes as disclosed herein. A series of spraying stations may be provided that defines a spraying sequence with each spraying station accommodating application of at least one LbL assembly thereat. Two or more spraying stations may perform identical spraying steps in accordance with current production requirements to support modularity of production capacity. Each such spray post may accommodate application of an impermeable barrier assembly according to an LbL assembly recipe selected from a plurality of LbL assembly recipes.

In one or more associated methods of fabricating one or more tires, at least one recipe for a selected LbL assembly may be employed during tire manufacture. In such methods, any selected LbL assembly recipe may be interchangeable with at least one non-selected dual LbL assembly recipe in that reservoirs may be changed as recipe ingredients change. The present disclosure contemplates grouping one or more reservoirs in a kit that may optionally include at least one selected rotation platform that is interchangeable with at least one other non-selected rotation platform. The kit may include also at least one selected reservoir station that is interchangeable with at least one other non-selected reservoir station. The presently disclosed reservoirs may be pre-manufactured in small or mass quantities as desired since the overall configuration may have a short lead time and the materials may be readily accessible through various commercial channels. In this manner, an extensive selection of LbL assembly recipes may thereby be made available that are suitable for standard and customizable tire manufacture.

A system of this type may include a plurality of pre-assembled spray posts with each spray post being pre-tuned to facilitate proper recipe application relative to one or more selected tires. One or more networked devices may be implemented, e.g., in a cluster or other distributed computing system. The network may be a LAN, a WAN, a SAN, a wireless network, a cellular network, radio links, optical links and/or the Internet, although the network is not limited to these network selections. Accompanying interactive software applications may be downloaded on a desktop or uploaded from a remote site onto a mobile device. Instructions for use of the software applications may also be included along with resources for accessing any remote platforms that provide one or more users with an interface for collaboration with others. It is contemplated that a mobile device may be employed that has the software applications pre-loaded for ready use. A server may be further configured to facilitate communication between at least one spray post as presently disclosed and one or more of the networked devices. A database may be built and accessed that includes stored data (e.g., tire types and sizes, LbL assembly recipes and correspondence there between, etc.) and calculated data forecasts that can be generated for intended tire integrity.

Selected combinations of aspects of the disclosed technology correspond to a plurality of different embodiments. It should be noted that each of the embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with equivalent features not expressly mentioned which perform the same or similar function.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm " Also, the dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" refers to one or more steps that may be performed in other ordering than shown without departing from the scope of the presently disclosed invention. As used herein, the term "method" or "process" may include one or more steps at least partly performed at least by one electronic or computer-based apparatus. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

The terms "comprising," "including," and "having" and their equivalent terms, as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. Ranges that are described as being "between a and b" are inclusive of the values for "a" and "b."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the disclosed apparatus have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

What is claimed is:

1. A method for forming an impermeable layer on an inner surface of a tire, comprising:
   (A) providing at least one spray post comprising:
      (i) a rotation platform for rotating one or more tires thereby;
      (ii) a reservoir station with one or more reservoirs provided thereat,
         wherein each reservoir houses one ingredient of a recipe for a layer-by-layer (LbL) assembly selected for application to the inner tire surface and the one or more ingredients include one or more solutions; and
      (iii) a rinse delivery system for delivering one or more rinses to the tire inner surface;
   (B) after building the tire exclusive of the barrier layer, spraying a solution layer onto the inner tire surface;
   (C) after spraying the solution layer, and before spraying another solution layer thereupon, spraying the inner tire surface with at least one rinse;
   (D) all rotating the tire around a tire axis during spraying of each solution layer and each rinse; and
   (E) forming the LbL assembly upon spraying a final layer of the recipe.

2. The method of claim 1, further comprising drying at least a portion of the inner tire surface after spraying the rinse and prior to spraying a subsequent layer solution.

3. The method of claim 1, wherein the one or more solutions is selected from at least one of a plurality of cationic solutions and a plurality of anionic solutions.

4. The method of claim 3, wherein at least one of the cationic solutions comprises a cationic material selected from the group consisting of polyethylene oxide, polyglycidol, polypropylene oxide, poly(vinyl methyl ether), polyvinyl alcohol, polyvinylpyrrolidone, polyallylamine, branched polyethylenimine, linear polyethylenimine, poly (acrylic acid), poly(methacrylic acid), copolymers thereof, and combinations thereof.

5. The method of claim 3, wherein at least one of the anionic solutions comprises an anionic material selected from the group consisting of polystyrene sulfonate, a polymethacrylic acid, a polyacrylic acid, a poly(acrylic acid, sodium salt), a polyanetholesulfonic acid sodium salt, poly (vinylsulfonic acid, sodium salt), and combinations thereof.

6. The method of claim 1, wherein the solution layer comprises a thickness in a range of about 0.5 nanometers to about 100 nanometers.

7. The method of claim 1, wherein a total of four or fewer solution layers are sprayed onto the inner tire surface.

8. The method of claim 1, wherein the barrier layer reduces diffusion of air, oxygen, ozone, and/or water vapor across a section of the tire comprising the barrier layer as compared to the same section of the same tire without the barrier layer.

9. The method of claim 1, wherein the rotation platform includes a spray delivery system for delivery of the solution layer to the inner tire surface.

10. The method of claim 9, wherein the spray delivery system includes one or more spray heads with each spray head in fluid communication with a reservoir, and each spray head has one or more nozzles arranged in a substantially linear relationship along a common axis.

11. The method of claim 10, further comprising delivering a selected solution to at least one corresponding selected nozzle.

12. The method of claim 9, wherein the spray delivery system is positionable relative to the inner tire surface so as to apply bead-to-bead spraying coverage thereon.

13. The method of claim 1, wherein drying includes applying suction to at least a portion of the inner tire surface.

14. The method of claim 1, wherein one or more solution layers and one or more rinses are sprayed sequentially.

15. The method of claim 1, wherein the recipe for an LbL assembly is selected from a plurality of LbL assembly recipes, and any selected LbL assembly recipe may be interchangeable with at least one non-selected LbL assembly recipe.

16. An assembly comprising a tire having an inner tire surface and an impermeable barrier layer formed therealong according to the method-of claim 1.

17. The assembly of claim 16, wherein the impermeable barrier layer is further formed by drying at least a portion of the inner tire surface after spraying the rinse and prior to spraying a subsequent solution layer.

18. The assembly of claim 17, wherein drying includes applying suction to at least a portion of the inner tire surface.

19. The assembly of claim 16, wherein the tire is positioned relative to a spray delivery system provided at the rotation platform for delivery of the solution layer to the inner tire surface; and wherein the spray delivery system includes one or more spray heads with each spray head in fluid communication with at least one reservoir; and wherein each spray head has one or more nozzles arranged in a substantially linear relationship along a common axis.

20. An apparatus for forming an impermeable barrier layer on an inner tire surface of a tire according to the method of claim 1, the apparatus comprising;

a selected rotation platform that is interchangeable with another non-selected rotation platform; and a selected reservoir station that is interchangeable with another non-selected reservoir station; wherein the tire is positionable relative to a spray delivery system provided at each rotation platform for delivery of at least one solution layer to the inner tire surface; wherein each spray delivery system includes one or more spray heads with each spray head in fluid communication with at least one reservoir; and wherein each spray head has one or more nozzles arranged in a substantially linear relationship along a common axis.

* * * * *

UNITED STATES PATENT AND TRADEMARK OFFICE
CERTIFICATE OF CORRECTION

PATENT NO.         : 10,016,952 B2
APPLICATION NO.    : 15/532048
DATED              : July 10, 2018
INVENTOR(S)        : Jaime C. Grunlan et al.

Page 1 of 1

It is certified that error appears in the above-identified patent and that said Letters Patent is hereby corrected as shown below:

In the Claims

In Claim 1, Line 58 of Column 11 please delete:
"all"

Signed and Sealed this
Twenty-third Day of October, 2018

Andrei Iancu
*Director of the United States Patent and Trademark Office*